United States Patent
Srinivasan (10) Patent No.: US 11,035,281 B2
(45) Date of Patent: Jun. 15, 2021

(54) SOOT LOAD ESTIMATION USING DUAL DIFFERENTIAL PRESSURE SENSORS

(71) Applicant: CUMMINS EMISSION SOLUTIONS INC., Columbus, IN (US)

(72) Inventor: Sriram Srinivasan, Greenwood, IN (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 16/975,982

(22) PCT Filed: Mar. 5, 2018

(86) PCT No.: PCT/US2018/020894
§ 371 (c)(1),
(2) Date: Aug. 26, 2020

(87) PCT Pub. No.: WO2019/172875
PCT Pub. Date: Sep. 12, 2019

(65) Prior Publication Data
US 2021/0003060 A1   Jan. 7, 2021

(51) Int. Cl.
| *F01N 9/00* | (2006.01) |
| *F01N 3/021* | (2006.01) |
| *F01N 11/00* | (2006.01) |

(52) U.S. Cl.
CPC ............. *F01N 9/002* (2013.01); *F01N 3/021* (2013.01); *F01N 11/002* (2013.01); *F01N 2900/1606* (2013.01)

(58) Field of Classification Search
CPC ........ F01N 9/002; F01N 3/021; F01N 11/002; F01N 2900/1606
See application file for complete search history.

(56) References Cited

U.S. PATENT DOCUMENTS

| 8,266,890 B2 | 9/2012 | Singh |
| 8,316,635 B2 | 11/2012 | Zhang et al. |

(Continued)

FOREIGN PATENT DOCUMENTS

| EP | 2 090 767 A1 | 8/2009 |
| EP | 2 574 762 A1 | 4/2013 |

OTHER PUBLICATIONS

International Search Report and Written Opinion for PCT Application No. PCT/US2018/020894, dated May 25, 2018.

*Primary Examiner* — Matthew T Largi
(74) *Attorney, Agent, or Firm* — Foley & Lardner LLP (57) ABSTRACT

An exhaust filtration system comprises a first pressure sensor and a second pressure sensor, each configured to measure pressure in the exhaust filtration system under low-flow conditions. The exhaust filtration system comprises a third pressure sensor and a fourth pressure sensor, each configured to measure pressure in the exhaust filtration system under high-flow conditions. A flow rate of exhaust gas flowing through the exhaust filtration system is periodically determined. When the flow rate is below a predetermined flow rate threshold, the first and second pressure sensors are used to measure pressure in the exhaust filtration system, and a soot load of the exhaust filtration system is estimated using the pressure measured by the first and second pressure sensors. When the flow rate is above the predetermined flow rate threshold, the third and fourth pressure sensors are used to measure pressure in the exhaust filtration system and a soot load of the exhaust filtration system is estimated using the pressure measured by the third and fourth pressure sensors.

23 Claims, 5 Drawing Sheets

(56) References Cited

U.S. PATENT DOCUMENTS

| | | | |
|---|---|---|---|
| 8,332,124 B2 | 12/2012 | George et al. | |
| 8,478,565 B2 | 7/2013 | Ardanese et al. | |
| 8,646,257 B2 | 2/2014 | Svensson et al. | |
| 8,935,953 B2 | 1/2015 | Sun et al. | |
| 9,140,156 B2 | 9/2015 | Swoish et al. | |
| 9,328,644 B2 | 5/2016 | Cui et al. | |
| 2005/0000207 A1* | 1/2005 | Christi | F01N 3/225 60/274 |
| 2007/0144149 A1* | 6/2007 | Kolavennu | F01N 3/0814 60/286 |
| 2008/0202103 A1 | 8/2008 | Henderson et al. | |
| 2008/0215205 A1* | 9/2008 | Kariya | F01N 11/002 701/31.4 |
| 2010/0132339 A1* | 6/2010 | Barkhage | F01N 3/0235 60/287 |
| 2013/0327019 A1 | 12/2013 | Zhan et al. | |
| 2014/0338434 A1 | 11/2014 | Sun et al. | |
| 2015/0088399 A1 | 3/2015 | Sun et al. | |
| 2015/0167517 A1 | 6/2015 | Dong et al. | |
| 2015/0252707 A1* | 9/2015 | Nishizawa | F01N 3/0821 60/274 |
| 2016/0103032 A1* | 4/2016 | Nakano | G01M 15/14 73/112.01 |
| 2017/0159535 A1 | 6/2017 | Hall et al. | |
| 2019/0257235 A1* | 8/2019 | Van Nieuwstadt | F01N 3/021 |

* cited by examiner

SOOT LOAD ESTIMATION USING DUAL DIFFERENTIAL PRESSURE SENSORS

CROSS REFERENCE TO RELATED APPLICATIONS

The present application is a national stage application of PCT Application No. PCT/US2018/020894, filed Mar. 5, 2018, the contents of which are incorporated herein by reference in their entirety.

TECHNICAL FIELD

The present application relates generally to systems and methods for improved soot load estimation using dual differential pressure sensors.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen and water, with the aid of a catalyst and a reductant. The catalyst may be included in a catalyst chamber of an exhaust system, such as that of a vehicle or power generation unit. A reductant may be typically introduced into the exhaust gas flow prior to the catalyst chamber. To introduce the reductant into the exhaust gas flow for the SCR process, the reductant is introduced through a dosing module (doser), which may spray the reductant into an exhaust pipe of the exhaust system upstream of the catalyst chamber. The SCR system may include one or more sensors to monitor conditions within the exhaust system.

Increasingly stringent legislative requirements promulgated by the different regulatory bodies including, for example, the Environmental Protection Agency (EPA) and California Air Resources Board (CARB), require the development of robust control algorithms that not only facilitate an optimal operation of the aftertreatment system, but also use on-board diagnostics (OBD) to quickly identify scenarios where performance of the system is compromised. At the same time, it is also vital to ensure that OBD algorithms do not misdiagnose a failure condition and cause unnecessary service actions.

One of the regulated values in emissions control for diesel engines is the particulate matter (PM), or soot, load on the particulate filter. Conventional exhaust aftertreatment systems use a diesel particulate filter (DPF) to trap PM. As the PM accumulates on the filter, the filter needs to be periodically "cleaned". Also known as filter regeneration, the "cleaning" is accomplished by increasing the temperatures of the DPF to a point where there the PM is oxidized. Knowing the PM loading value(s) on the DPF is critical to ensuring that control mechanisms for filter regeneration are used in an optimal manner. PM loading is conventionally estimated by correlating the pressure drop (using a pressure sensor) observed across the filter to a certain amount of PM loading and/or by using a model-based estimate of the PM loading.

One of the common problems encountered in DPF systems is the accuracy of the PM loading estimate. Inaccurate PM loading estimates lead to instances where the aftertreatment system goes into the regeneration mode more frequently than it is expected to. This phenomenon is known as excessive (too frequent) regeneration. Excessive DPF regeneration is an issue from both an OBD and a performance perspective and is a common source of customer dissatisfaction and warranty exposure. One of the sources of this inaccuracy can be traced back to the pressure sensor. This component suffers from a failure mode where the reading from the sensor cannot be trusted at low flow conditions (e.g., where the volumetric flow rate is less than 0.3 $m^3$/sec in contrast to high flow conditions, where the volumetric flow rate is above 0.75 $m^3$/sec). This leads to an erroneous PM loading estimation, which in turn results in Too Frequent Regeneration (TFR) errors.

SUMMARY

Implementations described herein relate to improved soot load estimation using dual differential pressure sensors in an exhaust filtration system of an emissions control and aftertreatment system.

One embodiment relates to a method for estimating soot load in an exhaust filtration system of an exhaust aftertreatment system that is configured to receive exhaust gas from an engine. The method includes providing an exhaust filtration system comprising a first pressure sensor and a second pressure sensor each configured to measure pressure in the exhaust filtration system under low-flow conditions and a third pressure sensor and a fourth pressure sensor each configured to measure pressure in the exhaust filtration system under high-flow conditions. The method includes periodically determining a flow rate of exhaust gas flowing through the exhaust filtration system. When the flow rate is below a predetermined flow rate threshold, the first and second pressure sensors are used to measure pressure in the exhaust filtration system, and a soot load of the exhaust filtration system is estimated using the pressure measured by the first and second pressure sensors. When the flow rate is above the predetermined flow rate threshold, the third and fourth pressure sensors are used to measure pressure in the exhaust filtration system and a soot load of the exhaust filtration system is estimated using the pressure measured by the third and fourth pressure sensors.

In some embodiments, the predetermined flow rate threshold is in a range of 0.05 to 1.5 $m^3$/s. In some embodiments, the predetermined flow rate threshold is in a range of 0.1 to 1.4 $m^3$/s. In some embodiments, the predetermined flow rate threshold is in a range of 0.3 to 1.1 $m^3$/s. In some embodiments, the predetermined flow rate threshold is in a range of 0.5 to 0.9 $m^3$/s.

In some embodiments, when the flow rate is below the predetermined flow rate threshold, the soot load is estimated based on a difference between a pressure measured by the first sensor and a pressure measured by the second sensor; and when the flow rate is above the predetermined flow rate threshold, the soot load is estimated based on a difference between a pressure measured by the third sensor and a pressure measured by the fourth sensor.

In some embodiments, the method includes comparing the estimated soot load to a predetermined soot load threshold. In some embodiments, the method includes running an exhaust filter regeneration process when the estimated soot load is higher than the predetermined soot load threshold. In some embodiments, the soot load threshold is at least 4.5 g/L. In some embodiments, the soot load threshold is in a range of 4.5-6 g/L.

In some embodiments, in the step of periodically determining the flow rate, the flow rate is updated at a rate of at least 5 Hz.

In some embodiments, the first and second pressure sensors are calibrated for use in measuring a first range of pressures, and the third and fourth pressure sensors are calibrated for use in measuring a second range of pressures. At least a portion of the second range of pressures is greater than at least a portion of the first range of pressures. In some embodiments, the first and second pressure sensors are rated for use in measuring a first range of pressures, and the third and fourth pressure sensors are rated for use in measuring a second range of pressures. At least a portion of the second range of pressures is greater than at least a portion of the first range of pressures.

Another embodiment relates to an exhaust filtration system. The exhaust filtration system comprises a first pressure sensor and a second pressure sensor, each configured to measure pressure in the exhaust filtration system under low-flow conditions. The exhaust filtration system comprises a third pressure sensor and a fourth pressure sensor, each configured to measure pressure in the exhaust filtration system under high-flow conditions. A flow rate of exhaust gas flowing through the exhaust filtration system is periodically determined. When the flow rate is below a predetermined flow rate threshold, the first and second pressure sensors are used to measure pressure in the exhaust filtration system, and a soot load of the exhaust filtration system is estimated using the pressure measured by the first and second pressure sensors. When the flow rate is above the predetermined flow rate threshold, the third and fourth pressure sensors are used to measure pressure in the exhaust filtration system and a soot load of the exhaust filtration system is estimated using the pressure measured by the third and fourth pressure sensors.

In some embodiments, the predetermined flow rate threshold is in a range of 0.05 to 1.5 $m^3/s$. In some embodiments, the predetermined flow rate threshold is in a range of 0.1 to 1.4 $m^3/s$. In some embodiments, the predetermined flow rate threshold is in a range of 0.3 to 1.1 $m^3/s$. In some embodiments, the predetermined flow rate threshold is in a range of 0.5 to 0.9 $m^3/s$.

In some embodiments, the controller is further configured to, when the flow rate is below the predetermined flow rate threshold, estimate the soot load based on a difference between a pressure measured by the first sensor and a pressure measured by the second sensor. The controller is further configured to, when the flow rate is above the predetermined flow rate threshold, estimate the soot load based on a difference between a pressure measured by the third sensor and a pressure measured by the fourth sensor.

In some embodiments, the controller is further configured to compare the estimated soot load to a predetermined soot load threshold. In some embodiments, the controller is further configured to run an exhaust filter regeneration process when the estimated soot load is higher than the predetermined soot load threshold. In some embodiments, the soot load threshold is at least 4.5 g/L. In some embodiments, the soot load threshold is in a range of 4.5-6 g/L.

In some embodiments, in the step of periodically determining the flow rate by the controller, the flow rate is updated at a rate of at least 5 Hz.

In some embodiments, the first and second pressure sensors are calibrated for use in measuring a first range of pressures, and the third and fourth pressure sensors are calibrated for use in measuring a second range of pressures. At least a portion of the second range of pressures is greater than at least a portion of the first range of pressures. In some embodiments, the first and second pressure sensors are rated for use in measuring a first range of pressures, and the third and fourth pressure sensors are rated for use in measuring a second range of pressures. At least a portion of the second range of pressures is greater than at least a portion of the first range of pressures.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of improved soot load estimation using dual differential pressure sensors. The various concepts introduced above and discussed in greater detail below may be implemented in any of numerous ways, as the described concepts are not limited to any particular manner of implementation. Examples of specific implementations and applications are provided primarily for illustrative purposes.

1. Overview

Methods, apparatus, assemblies and/or systems are provided to improve certain performance characteristics of an aftertreatment system, including, for example, soot load estimation using dual differential pressure sensors. As will be appreciated, in an exhaust aftertreatment system comprising a particulate filter and two sets of differential pressure sensors, confidence in soot load estimation is improved. The first set of differential pressure sensors is designed to be accurate at low flow conditions, and the second set of differential pressure sensors is designed to be accurate at high flow conditions. In some embodiments, the integrity of the differential pressure measurement and the corresponding soot loading estimate is maintained by using two different sets of pressure measurements at different operating regions.

2. Overview of Aftertreatment System

Figure 1:
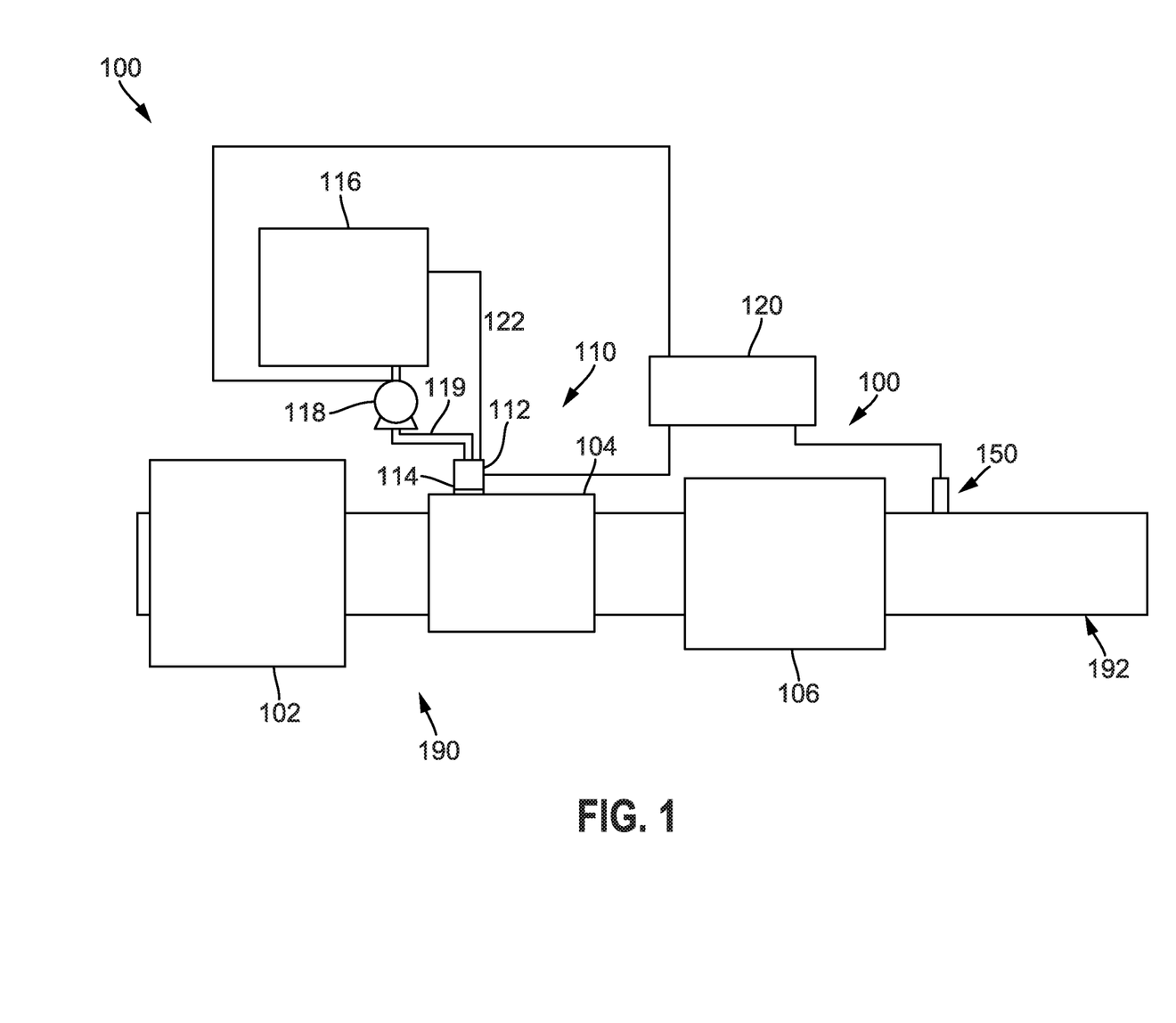
FIG. 1 is a block schematic diagram of an example aftertreatment system comprising an example reductant delivery system for an exhaust system, according to an example embodiment.

FIG. 1 depicts an aftertreatment system 100 having an example reductant delivery system 110 for an exhaust system 190. The aftertreatment system 100 includes a particulate filter 102 (such as a diesel particulate filter (DPF)), the reductant delivery system 110, a decomposition chamber or reactor 104, a SCR catalyst unit 106, and a sensor 150.

The particulate filter 102 is configured to remove particulate matter, such as soot, from exhaust gas flowing in the exhaust system 190. The particulate filter 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes the reductant delivery system 110 having a doser 112 configured to dose the reductant into the decomposition chamber 104. In some implementations, the reductant is inserted upstream of the SCR catalyst unit 106. The reductant droplets then undergo the processes of evaporation, thermolysis, and hydrolysis to form gaseous ammonia within the exhaust system 190. The decomposition chamber 104 includes an inlet in fluid communication with the particulate filter 102 to receive the exhaust gas containing $NO_x$ emissions and an outlet for the exhaust gas, $NO_x$ emissions, ammonia, and/or remaining reductant to flow to the SCR catalyst unit 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116 via the reductant insertion conduit 119. As further described with reference to the embodiment of FIG. 2, the reductant insertion conduit 119 includes a reductant delivery pipe and a reductant insertion control valve. The reductant return line 122 connects the doser 112 to the reductant source 116 and serves as a conduit for excess reductant.

In some implementations, a pump 118 is used to pressurize the reductant from the reductant source 116 for delivery to the doser 112. The pump 118 is fluidly coupled to the reductant source 116. In some implementations, the pump 118 is a reciprocating displacement pump, such as a piston pump, a plunger-type pump, and/or a diaphragm pump. In other implementations, the pump 118 is a centrifugal pump. According to various embodiments, the pump 118 may be unidirectional or bidirectional. Where the pump 118 is bidirectional, the aftertreatment system 100 may be configured such that a portion of the reductant is returned to the reductant source 116 via the reductant insertion conduit 119 or another suitable conduit. In some implementations, the pump 118 is a variable displacement pump configurable to adjust the amount of the dosed reductant as the reductant is advanced from the reductant source 116.

The doser 112 and pump 118 are electrically or communicatively coupled to a controller 120. The controller 120 is configured to control the doser 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language. The controller 120 may be communicatively coupled to other components of the system through a suitable electrical or electronic communications interface.

The SCR catalyst unit 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst unit 106 includes an inlet in fluid communication with the decomposition chamber 104 from which exhaust gas and reductant is received and an outlet in fluid communication with an end 192 of the exhaust system 190.

The exhaust system 190 may further include an oxidation catalyst unit (e.g., a diesel oxidation catalyst (DOC) unit) in fluid communication with the exhaust system 190 (e.g., downstream of the SCR catalyst unit 106 or upstream of the particulate filter 102) to oxidize hydrocarbons and carbon monoxide in the exhaust gas.

In some implementations, the particulate filter 102 is positioned downstream of the decomposition chamber or reactor pipe 104. For instance, the particulate filter 102 and the SCR catalyst unit 106 may be combined into a single unit. In some implementations, the doser 112 may instead be positioned downstream of a turbocharger or upstream of a turbocharger.

The sensor 150 is coupled to the exhaust system 190 to detect an operating condition associated with the exhaust system 190, such as a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst unit 106, it should be understood that the sensor 150 may be positioned at any other position of the exhaust system 190, including upstream of the particulate filter 102, within the particulate filter 102, between the particulate filter 102 and the decomposition chamber 104, within the decomposition chamber 104, between the decomposition chamber 104 and the SCR catalyst unit 106, within the SCR catalyst unit 106, or downstream of the SCR catalyst unit 106. In addition, two or more sensor 150 may be utilized for detecting a condition of the exhaust gas or other components of the exhaust system 190. For example, two, three, four, five, or six sensors 150 may be provided, with each sensor 150 located at one of the foregoing positions of the exhaust system 190.

Figure 2:
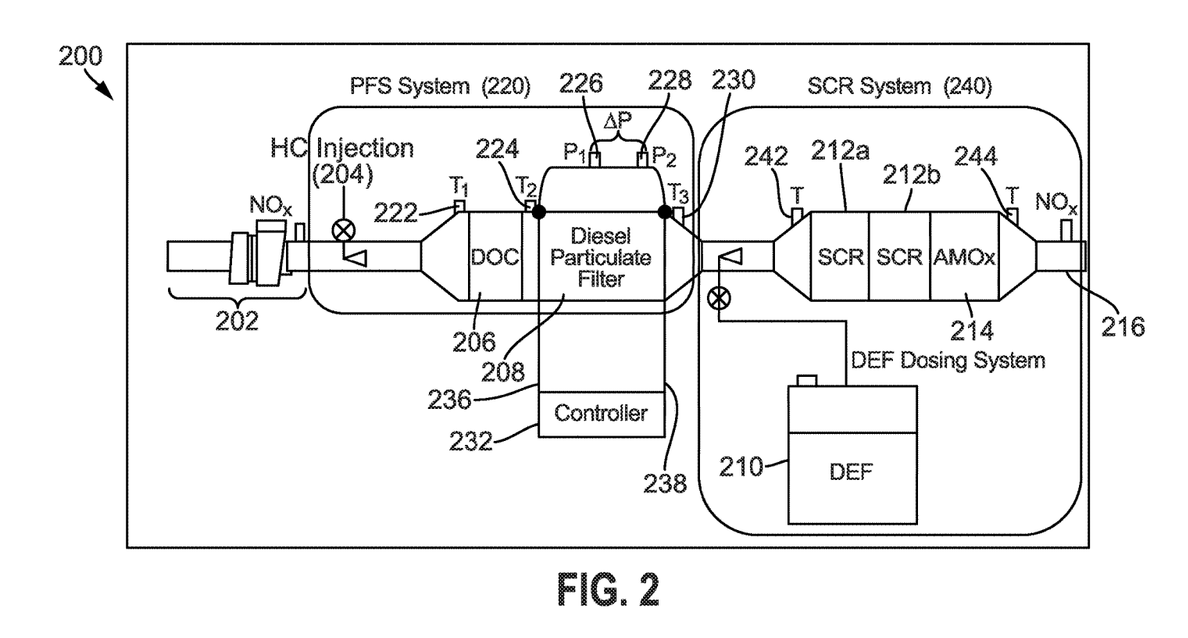
FIG. 2 is a block schematic diagram of an example aftertreatment system comprising an exhaust filtration system, according to an example embodiment.

3. Implementations of Systems and Methods for Improved Soot Load Estimation Using Dual Differential Pressure Sensors FIG. 2 is a block schematic diagram of an example aftertreatment system 200 comprising an exhaust filtration system 220, according to an example embodiment. The aftertreatment system 200 comprises the exhaust filtration system 220, an SCR system 240, and an exhaust gas conduit 202.

The exhaust filtration system 220 is positioned downstream of the exhaust gas conduit 202 and is configured to receive exhaust gas that flows through the conduit from an engine. The exhaust gas contains particulate matter, which is filtered out by the exhaust filtration system 220. Optionally, the exhaust filtration system 220 may comprise a hydrocarbon injector 204, which, in some embodiments, may be positioned upstream of the remaining components of the exhaust filtration system 220. In some embodiments, the hydrocarbon injector comprises a delivery mechanism (such as a storage tank, a delivery conduit, and at least one valve) and a hydrocarbon doser configured to dispense the appropriate amount of hydrocarbon into the exhaust gas stream that flows through the exhaust filtration system 220.

The exhaust filtration system 220 further comprises an oxidation catalyst unit 206 and an exhaust filter 208. In the example embodiment, the oxidation catalyst unit 206 is a DOC. Exhaust gas flows, via the conduit 202, through the oxidation catalyst unit 206. The oxidation catalyst unit 206 is configured to oxidize the hydrocarbons and carbon monoxide in the exhaust stream, which then flows to and through the exhaust filter 208 positioned downstream of the oxidation catalyst unit 206. In some embodiments, the exhaust filter 208 is a DPF. The exhaust filter 208 may be wall flow or flow-through and may comprise, for example, cordierite, silicon carbide, another ceramic material and/or metal fibers. The exhaust filter 208 comprises an inlet, where the exhaust gas is received, and an outlet, where the exhaust gas exits after having particulate matter substantially filtered from the exhaust gas and/or converting the particulate matter into carbon dioxide.

The exhaust filtration system 220 comprises a plurality of sensors having at least one sensor 150. In the example embodiment, the plurality of sensors includes electronic and/or electrical sensors. The sensors 150 in the plurality of sensors (for example, the first temperature sensor 222, the second temperature sensor 224, the third temperature sensor 230, the first pressure sensor 226, and the second pressure sensor 228) are electronically coupled to the controller 232 and configured to provide values and/or signals pertaining to operation of the components of the exhaust filtration system 220. In particular, the first pressure sensor 226 is coupled to the controller 232 through a first signal carrier line 236 and the second pressure sensor 228 is coupled to the controller 232 through a second signal carrier line 238. The signal carrier lines, such as the first signal carrier line 236 and the second signal carrier line 238, may be structured to carry electrical signals (e.g., a signal wire comprising a metal) and/or electronic signals (e.g., a data bus implemented on a semiconductor medium, such as a silicon wafer, or on another suitable solid-state medium, such as an optical fiber medium) to and from the controller 232.

Some or all sensors 150 in the plurality of sensors (for example, the first temperature sensor 222, the second temperature sensor 224, the third temperature sensor 230, the first pressure sensor 226, and the second pressure sensor 228) may be implemented as transducer(s) configured to convert value (e.g., temperature or pressure) reading(s) into electrical signal(s). The sensors may be configured to output voltage signal(s) based on the captured value(s). In some embodiments, some or all of the sensors 150 may include analog/digital converter(s) to convert the voltage signal(s) into digital signal(s) for interpretation by the processor of the controller 232.

Some or all of the sensors 150 in the plurality of sensors may be configured to determine the temperature within different regions of the exhaust filtration system 220. For example, the first temperature sensor 222 may be positioned upstream of the oxidation catalyst 206, the second temperature sensor 224 may be positioned downstream of the oxidation catalyst 206, and the third temperature sensor 230 may be positioned downstream of the exhaust filter 208. The temperature values may be used, according to some embodiments, in estimating the soot load on the exhaust filter 208. Additionally or alternatively, some or all of the sensors 150 in the plurality of sensors may be configured to determine the pressure within different regions of the exhaust filtration system 220. For example, the first pressure sensor 226 may be configured to determine a first pressure value and the second pressure sensor 228 may be configured to determine a second pressure value in a different region within or around the exhaust filter 208. In some embodiments and depending, for example, on the architecture and configuration of the exhaust filter 208, the first pressure sensor 226 may be positioned downstream of the second pressure sensor 228.

In some embodiments, the exhaust filtration system 220 comprises at least two sets of differential pressure sensors, wherein all the differential pressure sensors in each respective set are configured to be accurate within a certain range of exhaust flow values (for example, under low-flow conditions or under high-flow conditions). In such embodiments, the exhaust filtration system 220 may comprise multiple first pressure sensors 226 and multiple second pressure sensors 228. For example, the first pressure sensor 226 in the exhaust filtration system 220 may be a first low-flow differential pressure sensor and the second pressure sensor 228 in the exhaust filtration system 220 may be a second low-flow differential pressure sensor. Another first pressure sensor 226 in the exhaust filtration system 220 may be a first high-flow differential pressure sensor and another second pressure sensor 228 in the exhaust filtration system 220 may be a second high-flow differential pressure sensor. The exhaust filter 208 is periodically regenerated based on events and/or triggers determined, for example, with reference to the method(s) of FIG. 3 and/or FIG. 5. In particular, as further described in reference to FIG. 5, the controller 232 is configured to evaluate the flow conditions through the exhaust filter 208 and, based on this evaluation, determine whether the low-flow or high-flow differential pressure sensors should be used to provide the pressure readings for estimating the particulate matter load on the exhaust filter 208. In some embodiments, the first low-flow differential pressure sensor and the second low-flow differential pressure sensor are calibrated for use in measuring a first range of pressures. The first high-flow differential pressure sensor and the second high-flow differential pressure sensor are calibrated for use in measuring a second range of pressures. At least a portion of the second range of pressures is greater than at least a portion of the first range of pressures. In an example embodiment, the first low-flow differential pressure sensor and the second low-flow differential pressure sensor are rated for use in measuring a first range of pressures, and the first high-flow differential pressure sensor and the second high-flow differential pressure sensor are rated for use in measuring a second range of pressures. At least a portion of the second range of pressures is greater than at least a portion of the first range of pressures. The first range of pressures may include values lower than or equal to the flow rate threshold, and the second range of pressures may include values greater than or equal to the flow rate threshold.

The SCR system 240 is configured to receive the exhaust gas stream after it has passed through the exhaust filter 208. According to various embodiments, the SCR system 240 may comprise one or more SCR units (such as an SCR unit 212a and an SCR unit 212b), positioned serially or in parallel, and an optional AMOx catalyst unit 214, which may be positioned downstream of the one or more SCR units. Upstream of the one or more SCR units, the SCR system 240 is configured to provide a reductant or a reductant precursor, such as DEF, through a dosing architecture comprising a doser 210, such as the reductant dosing architecture described in reference to FIG. 1. According to various embodiments, reductants and/or reductant precursor formulations may include solids, gases, and/or liquids. Examples of solid reductant precursor formulations and/or carriers include ammonium salts and metal amines. In solid-state reductant delivery systems, a cartridge or canister with a solid material, such as an ammonia precursor or a substance with absorbed ammonia, may be carried onboard. During engine operation, the carrier material may be heated to release ammonia gas, which is metered into the exhaust gas. Examples of gaseous reductant formulations include gaseous ammonia, ammonia-air mixtures, and ammonia-nitrogen mixtures. Examples of liquid reductant formulations include aqueous ammonia and automotive-grade urea such as AdBlue®, BlueTEC™, and other Diesel Exhaust Fluid (DEF) products. An example ISO 22241-1:2006 DEF is an aqueous urea solution including 32.5% urea and 67.5% deionized water. The urea in the DEF turns to ammonia when heated. The ammonia reacts with the NOx in the exhaust stream to chemically reduce the NOx to water ($H_2O$) and nitrogen ($N_2$). A pump may be used to pressurize the reductant for delivery from the reductant source to the dosing module and/or an SCR catalyst.

The SCR system 240 optionally includes a first SCR temperature sensor 242 upstream of the one or more SCR unit(s) and a second SCR temperature sensor 244 downstream of the one or more SCR unit(s). These sensors may be electrically connected to a controller, such as the controller 232, to monitor the temperature of the one or more SCR unit(s) and, optionally, to coordinate the regeneration of the one or more SCR unit(s) with the regeneration of the exhaust filter 208 by controlling the temperature of the exhaust stream as described above or through another suitable method.

The SCR system 240 releases the purified exhaust stream through the conduit 216 positioned downstream of the one or more SCR unit(s).

Figure 3:
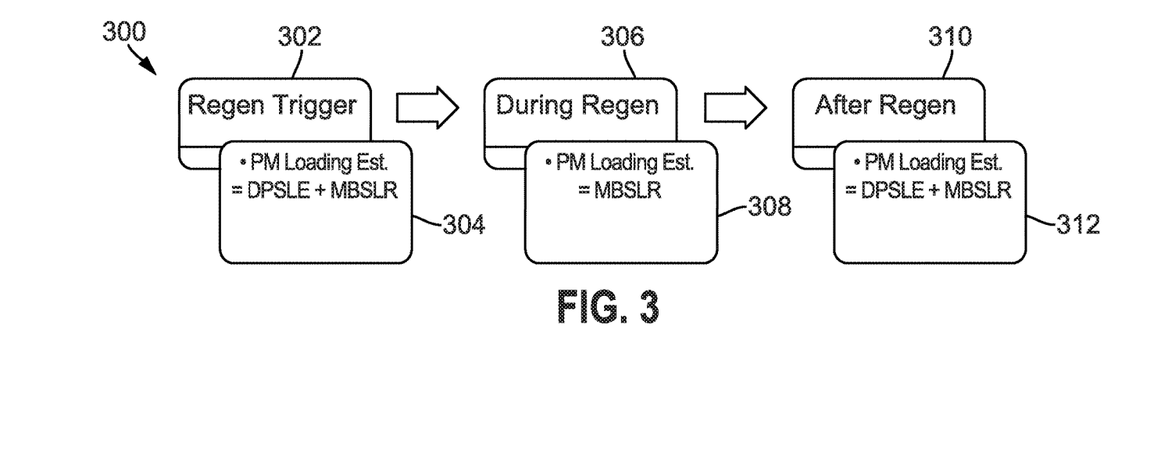
FIG. 3 is a block schematic diagram of an example method for filter regeneration in the system of FIG. 2, according to an example embodiment.

FIG. 3 is a block schematic diagram of an example method 300 for filter regeneration in the system of FIG. 2, according to an example embodiment. When the method 300 is executed, the exhaust filter is regenerated and the soot (particulate matter) is burned off or otherwise removed by, for example, using a catalyst. The method 300 for filter regeneration comprises triggering a regeneration event (at 302), running a regeneration process (at 306) and running post-regeneration calculations (at 310).

Figure 4:
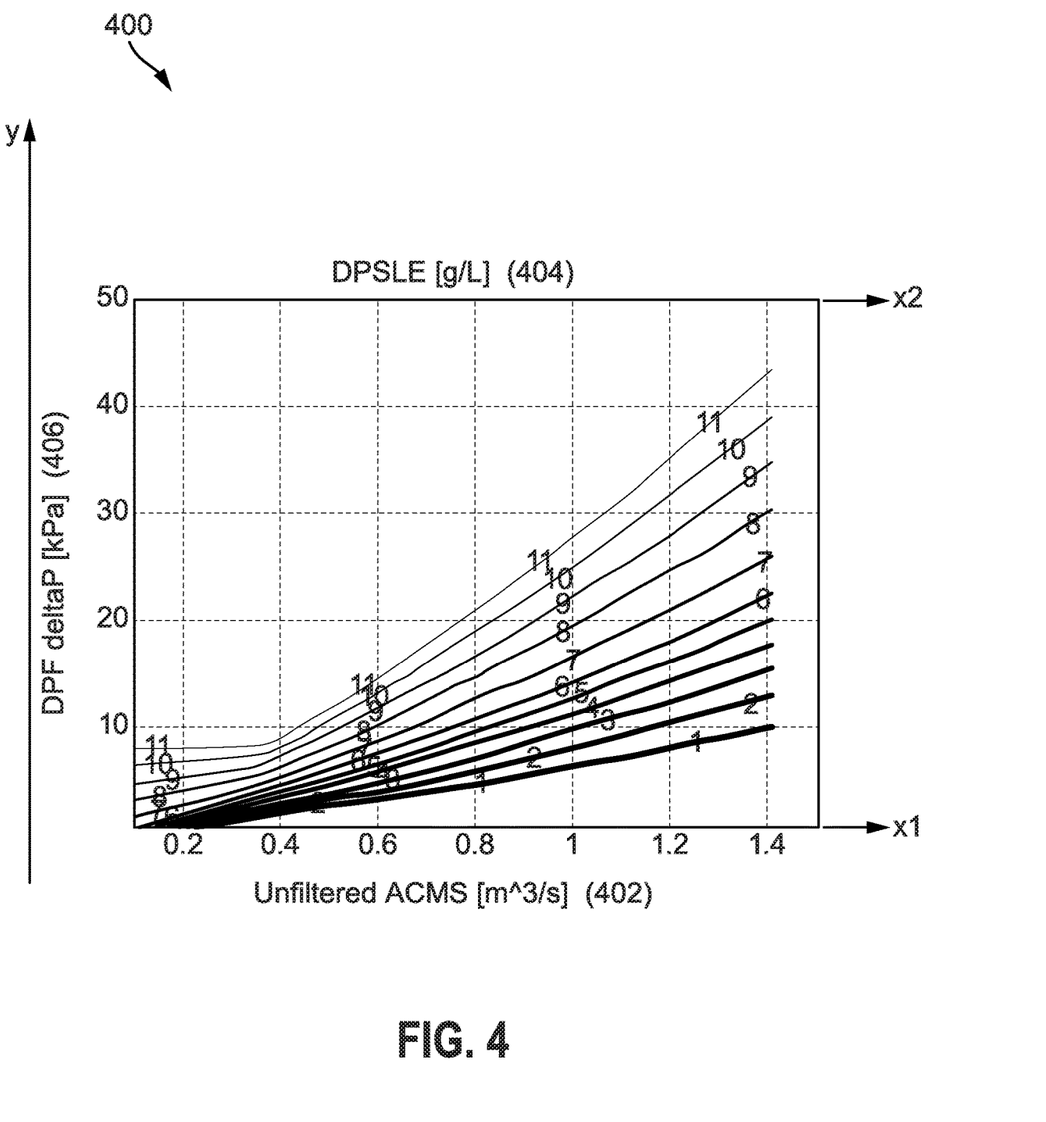
FIG. 4 is a graph showing the accuracy of dP-based soot load estimate (DPSLE) as a function of the flow, according to an example embodiment.

At 302, the regeneration event is triggered by using an example method shown at 304. In some embodiments, the regeneration trigger event comprises estimating a PM loading value. The PM loading value may be estimated by generating a dP-based soot load estimate (DPSLE) and a mass-based soot load rate (MBSLR) and then adding these values. The DPSLE is derived by sampling the differential pressure using the first pressure sensor (for example, the first low-flow differential pressure sensor) and the second pressure sensor (for example, the second low-flow differential pressure sensor) and then correlating the differential to a certain amount of contaminant loading on the exhaust filter 208 as shown in FIG. 4. The accuracy of this measurement is a function of the flow as shown below. The MBSLR calculation uses a model to estimate the amount of soot mass expelled downstream of the engine based on the operating conditions of the engine. In some embodiments, MBSLR is calculated using an equation: soot from the engine=soot load on the DPF+soot burnt due to passive oxidation+soot burnt due to active oxidation. The resulting combined value (sum of DPSLE and MBSLR) is compared to a threshold to determine if a filter, such as the exhaust filter 208 of FIG. 2, should be regenerated. In some embodiments, the value for the threshold is selected from the range of 4.5-6 g/L. In some embodiments, as illustrated with reference to components of an example system of FIG. 2, the regeneration process is triggered by capturing a first pressure value P1 using the first pressure sensor, contemporaneously or in near real time capturing a second pressure value P2 using the second pressure sensor, and calculating the delta (differential), dP, between the first pressure value and the second pressure value to determine whether the value of dP exceeds a predetermined threshold. In some embodiments, the predetermined threshold is within a range of values that represent the conditions for triggering the regeneration process, the range including a lower bound (a predetermined lower threshold for dP) and an upper bound (a predetermined upper threshold for dP). Example values for the predetermined lower threshold of dP and the predetermined upper threshold of dP are shown in FIG. 4.

At 306, the regeneration process is executed. In some embodiments, as part of the regeneration process, once it is triggered, particulate matter is subjected to combustion inside the exhaust filter 208 such as the soot burns off the exhaust filter 208. In one example embodiment, combustion is accomplished by raising the temperature of the exhaust filter 208 to at least 600 degrees Celsius as measured, for example, by taking the temperature values produced by the second temperature sensor 224 and/or the third temperature sensor 230 and monitoring their differential. According to various embodiments, the temperature of the exhaust filter 208 may be raised by raising the temperature of the exhaust gas stream that flows through. This can be done, for example, through late fuel injection, using resistive heating coils and/or using microwave energy to increase the temperature. Additionally, a catalytic oxidizer, such as hydrocarbon delivered through the hydrocarbon injector 204, may be used to further increase the exhaust temperature. While filter regeneration is in progress, the PM loading value is periodically estimated, at 308, by measuring the MBSLR and comparing the measurement to a threshold to determine if the regeneration process should continue.

At 310, the regeneration process is completed. After the regeneration process is completed, the PM loading value is again periodically estimated using the dP-based soot load estimate (DPSLE) and the mass-based soot load rate (MBSLR) and then adding these values at 312. The resulting combined value is compared to a threshold to determine if a filter, such as the exhaust filter 208 of FIG. 2, should be regenerated.

FIG. 4 is a graph 400 showing the accuracy of dP-based soot load estimate (DPSLE) 404 as a function of the flow 402 and the pressure differential 406, according to an example embodiment.

The first abscissa (the $x_1$ axis) shows a range of values (402) for the actual cubic meters per second (ACMS measured in $m^3$/sec) rate indicative of the volumetric flow rate across the filter, such as the exhaust filter 208, per second. The second abscissa (the $x_2$ axis) shows a range of values (404) for the DPSLE. The ordinate (the y axis) shows the pressure differential 406 such that each line on the graph 400 represents the observed pressure differential across the DPF at different volumetric flow levels at a single soot loading point.

As shown, while a separation can be observed between a 1 g/L pressure differential and 10 g/L pressure differential at higher ACMS values, this margin collapses as the flow rate decreases. Beneficially, in a dual differential pressure sensor setup disclosed herein, one set of sensors is configured to be accurate at higher ACMS values (i.e. high flow sensors) while the other set of sensors is configured to be accurate at lower ACMS values (i.e. low flow sensors). By using these sensors in combination, the controls system is better able to estimate the actual soot loading across the flow map, thereby reducing the potential for OBD misdiagnosis, such as the Too Frequent Regen (TFR) errors.

Figure 5:
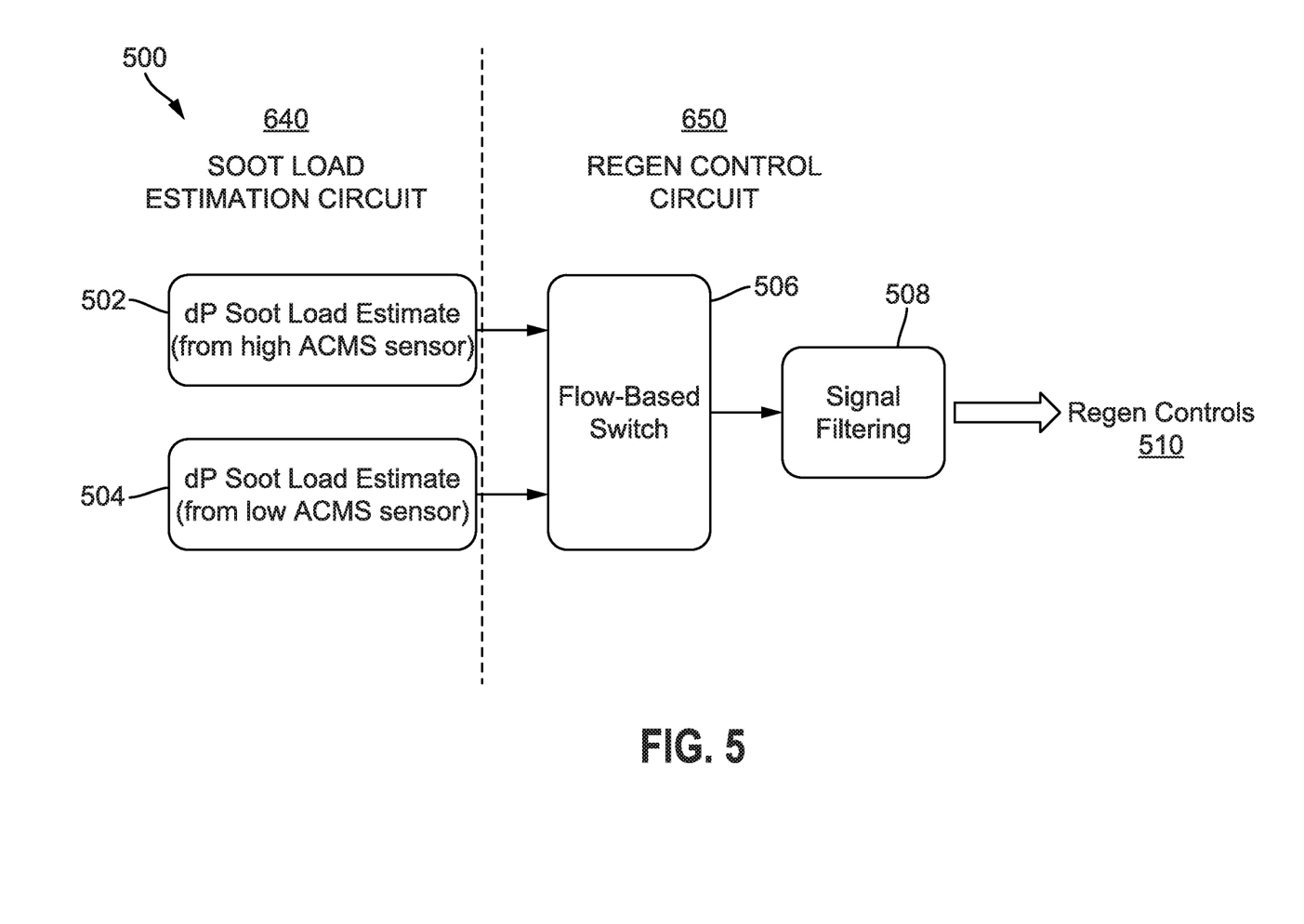
FIG. 5 is a block schematic diagram of a method for filter regeneration using dual-sensor dP-based soot load estimation (DPSLE), according to an example embodiment.

FIG. 5 is a block schematic diagram of a method 500 for filter regeneration using dual-sensor dP-based soot load estimation (DPSLE), according to an example embodiment. In the example embodiment, two sets of differential pressure sensors are employed. The first set of differential pressure sensors is designed to be accurate at low flow conditions, and the second set of differential pressure sensors is designed to be accurate at high flow conditions. The initiation and management of the regeneration mode for the exhaust filtration system 220 is managed by the regeneration control circuit 650 of a controller, such as the controller 232 shown in FIG. 2 and/or controller 600 shown in FIG. 6. As part of this process, the controller 232 is configured to evaluate the flow conditions through the exhaust filter 208 and, based on this evaluation, determine whether the low-flow or high-flow differential pressure sensors should be used to provide the pressure readings for estimating the particulate matter load on the exhaust filter 208. In an example embodiment, as further described below, a method for estimating soot load includes providing an exhaust filtration system that includes a first pressure sensor and a second pressure sensor, each configured to measure pressure in the exhaust filtration system under low-flow conditions, as well as a third pressure sensor and a fourth pressure sensor, each configured to measure pressure in the exhaust filtration system under high-flow conditions. In some embodiments, the first pressure sensor and the second pressure sensor are the first low-flow differential pressure sensor and the second low-flow differential pressure sensor, respectively, of FIG. 2. The third pressure sensor and the fourth pressure sensor is the first high-flow differential pressure sensor and the second high-flow differential pressure sensor, respectively, of FIG. 2. The method includes periodically determining a flow rate of exhaust gas flowing through the exhaust filtration system. In some embodiments, the flow rate is updated at a rate of at least 5 Hz. When the flow rate is below a predetermined flow rate threshold, the first and second pressure sensors are activated to measure pressure in the exhaust filtration system. When the flow rate is above the predetermined flow rate threshold, the third and fourth pressure sensors may be activated to measure pressure in the exhaust filtration system. In some embodiments, the predetermined flow rate threshold is in a range of 0.05 to 1.5 $m^3/s$. According to various embodiments, the threshold is a value or a range of values selected from a narrower range of values: e.g., 0.1 to 1.4 $m^3/s$, 0.3 to 1.1 $m^3/s$, and/or 0.5 to 0.9 $m^3/s$. A soot load of the exhaust filtration system is determined by calculating a difference in pressure measured by a currently active pair of sensors.

At 502, the first high-flow differential pressure sensor and the second high-flow differential pressure sensor (described in reference to FIG. 2), which are designed and/or configured to provide pressure readings with an acceptable margin of error at high-flow conditions, are activated to capture the pressure values P3 and P4, respectively.

At 504, the first low-flow differential pressure sensor and the second low-flow differential pressure sensor (described in reference to FIG. 2), which are designed and/or configured to provide pressure readings with an acceptable margin of error at low-flow conditions, are activated to capture the pressure values P1 and P2, respectively.

P1, P2, P3 and/or P4 are evaluated by the controller 232. The controller 232 comprises a soot load estimation circuit 640, which is configured to calculate a delta between either P1 and P2 (in low-flow conditions) or P3 and P4 (in high-flow conditions).

As described above, in some embodiments, steps 502 and 504 may be alternatively (to one another) executed based on periodically determining a flow rate of exhaust gas flowing through the exhaust filtration system and comparing the flow rate to a threshold to determine whether low-flow or high-flow sensors should be activated. For example, in some embodiments, at 506, the regeneration control circuit 650 of the controller 232 is configured to determine whether the current flow conditions are low- or high-flow. In some embodiments, step 506 is performed prior to performing step 502 and/or step 504. In some embodiments, step 506 is performed concurrently with either step 502 or step 504, such that the current flow conditions are continuously and/or periodically sampled and the system switches from high-flow sensors to low-flow sensors as needed. As part of determining whether the current flow conditions are low- or high-flow, the regeneration control circuit 650 determines the current actual cubic meters per second (ACMS) rate indicative of the flow rate, or the volume of exhaust gases flowing through the exhaust filter 208 per unit of time, such as per second. According to various embodiments, this determination is made by activating and taking the measurements using a suitable exhaust mass flow metering architecture, which may comprise a flow metering device configured to measure the exhaust flow through the exhaust filter 208 at pre-determined time intervals. Based on the ACMS rate, the regeneration control circuit 650 determines whether the pressure values provided by the low-flow or high-flow differential pressure sensors should be used.

At 508, the regeneration control circuit 650 provides a result of the above determination to the soot load estimation circuit 640.

At 510, the delta between either P1 and P2 or P3 and P4, depending on the determination made at 502-506, is evaluated by the soot load estimation circuit 640 in relation to a pre-determined DPSLE threshold. If the delta value is higher than the predetermined DPSLE threshold and the flow conditions indicate a low flow rate through the exhaust filter 208, the exhaust filtration system 220 is configured to go into a filter regeneration mode, as described in reference to FIG. 3. According to various embodiments, the DPSLE threshold under low-flow conditions may be different from the DPSLE threshold under high-flow conditions. In some embodiments, additional parameters can be evaluated to initiate the filter regeneration process, including exhaust temperature, exhaust mass flow rate and the like.

Figure 6:
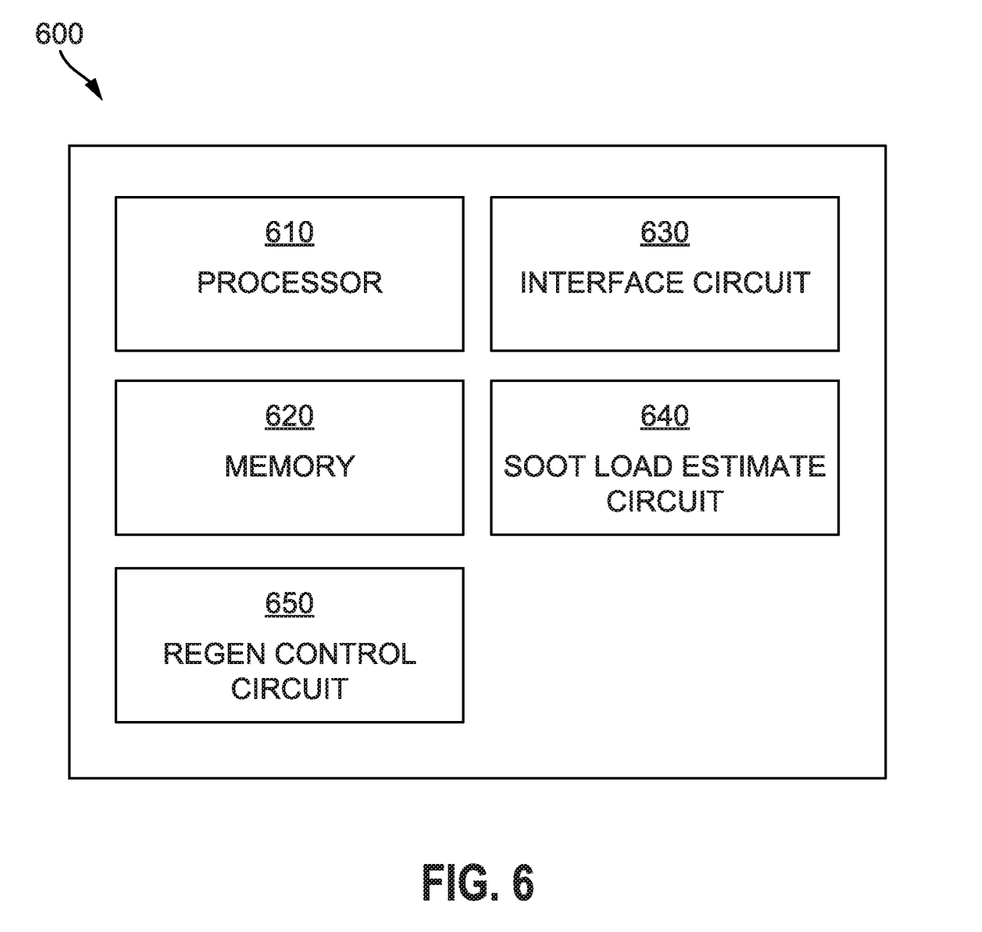
FIG. 6 is a block schematic diagram of a controller for soot load estimation, according to an example embodiment.

FIG. 6 is a block schematic diagram of a controller 600 for soot load estimation, according to an example embodiment. The controller 600 is configured to execute the processes of the method 500 of FIG. 5 in example aftertreatment system(s) of FIG. 1 and/or FIG. 2. The example controller 600 comprises at least one processor 610, a memory 620 and an interface circuit 630. The controller 600 is configured as described in reference to FIG. 1. As will be appreciated by one skilled in the art, the various programmable components of the controller 600 include a soot load estimation circuit 640 and a filter regeneration control circuit 650 configured to operate as described, for example, in reference to FIG. 5. These circuits may comprise instructions stored in non-transient memory, such as the memory 620. The instructions are compiled and/or executed by the processor 610 and communicated to various other components of the system through the interface circuit 630 via, for example, the communications circuitry comprising signal carrier lines 236 and 238 discussed in reference to FIG. 2.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC.

The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

As utilized herein, the terms "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The term "coupled" and the like as used herein means the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for estimating soot load in an exhaust filtration system of an exhaust aftertreatment system that is configured to receive exhaust gas from an engine, the method comprising:

providing the exhaust filtration system comprising:
a first pressure sensor located at an inlet of the exhaust filtration system configured to measure a first pressure in the exhaust filtration system under low-flow conditions and a second pressure sensor located at an outlet of the exhaust filtration system configured to measure a second pressure in the exhaust filtration system under low-flow conditions;
a third pressure sensor located at the inlet of the exhaust filtration system configured to measure a third pressure in the exhaust filtration system under high-flow conditions and a fourth pressure sensor located at the outlet of the exhaust filtration system configured to measure a fourth pressure in the exhaust filtration system under high-flow conditions;
periodically determining a flow rate of exhaust gas flowing through the exhaust filtration system;
when the flow rate is below a predetermined flow rate threshold, using the first and second pressure sensors to measure the first and second pressures in the exhaust filtration system, respectively, and estimating a soot load of the exhaust filtration system using the first and second pressures measured by the first and second pressure sensors; and when the flow rate is above the predetermined flow rate threshold, using the third and fourth pressure sensors to measure the third and fourth pressures in the exhaust filtration system, respectively, and estimating a soot load of the exhaust filtration system using the third and fourth pressures measured by the third and fourth pressure sensors.

2. The method of claim 1, wherein the predetermined flow rate threshold is in a range of 0.05 to 1.5 m³/s.

3. The method of claim 1, wherein:

when the flow rate is below the predetermined flow rate threshold, the soot load is estimated based on a difference between the first pressure measured by the first pressure sensor and the second pressure measured by the second pressure sensor; and when the flow rate is above the predetermined flow rate threshold, the soot load is estimated based on a difference between the third pressure measured by the third pressure sensor and the fourth pressure measured by the fourth pressure sensor.

4. The method of claim 1, further comprising comparing the estimated soot load to a predetermined soot load threshold.

5. The method of claim 4, further comprising running an exhaust filter regeneration process when the estimated soot load is higher than the predetermined soot load threshold.

6. The method of claim 4, wherein the predetermined soot load threshold is at least 4.5 g/L.

7. The method of claim 4, wherein the predetermined soot load threshold is in a range of 4.5-6 g/L.

8. The method of claim 1, wherein, in the step of periodically determining the flow rate, the flow rate is updated at a rate of at least 5 Hz.

9. The method of claim 1, wherein the first and second pressure sensors are calibrated for use in measuring a first range of pressures, and the third and fourth pressure sensors are calibrated for use in measuring a second range of pressures, wherein at least a portion of the second range of pressures is greater than at least a portion of the first range of pressures.

10. The method of claim 1, wherein the first and second pressure sensors are rated for use in measuring a first range of pressures, and the third and fourth pressure sensors are rated for use in measuring a second range of pressures, wherein at least a portion of the second range of pressures is greater than at least a portion of the first range of pressures.

11. An exhaust filtration system of an exhaust aftertreatment system that is configured to receive exhaust gas from an engine, the exhaust filtration system comprising:

a first pressure sensor located at an inlet of the exhaust filtration system configured to measure a first pressure in the exhaust filtration system under low-flow conditions and a second pressure sensor located at an outlet of the exhaust filtration system configured to measure a second pressure in the exhaust filtration system under low-flow conditions;

a third pressure sensor located at the inlet of the exhaust filtration system configured to measure a third pressure in the exhaust filtration system under high-flow conditions and a fourth pressure sensor located at the outlet of the exhaust filtration system configured to measure a fourth pressure in the exhaust filtration system under high-flow conditions; and a controller configured to:

periodically determine a flow rate of exhaust gas flowing through the exhaust filtration system;

when the flow rate is below a predetermined flow rate threshold, activate the first and second pressure sensors to measure the first and second pressures in the exhaust filtration system, respectively, and estimate a soot load of the exhaust filtration system using the first and second pressures measured by the first and second pressure sensors; and when the flow rate is above the predetermined flow rate threshold, activate the third and fourth pressure sensors to measure the third and fourth pressures in the exhaust filtration system, respectively, and estimate a soot load of the exhaust filtration system using the third and fourth pressures measured by the third and fourth pressure sensors.

12. The exhaust filtration system of claim 11, wherein the predetermined flow rate threshold is in a range of 0.05 to 1.5 m³/s.

13. The exhaust filtration system of claim 11, wherein the predetermined flow rate threshold is in a range of 0.1 to 1.4 m³/s.

14. The exhaust filtration system of claim 11, wherein the predetermined flow rate threshold is in a range of 0.3 to 1.1 m³/s.

15. The exhaust filtration system of claim 11, wherein the predetermined flow rate threshold is in a range of 0.5 to 0.9 m³/s.

16. The exhaust filtration system of claim 11, wherein the controller is further configured to:

when the flow rate is below the predetermined flow rate threshold, estimate the soot load based on a difference between the first pressure measured by the first pressure sensor and the second pressure measured by the second pressure sensor; and when the flow rate is above the predetermined flow rate threshold, estimate the soot load based on a difference between the third pressure measured by the third pressure sensor and the fourth pressure measured by the fourth pressure sensor.

17. The exhaust filtration system of claim 11, wherein the controller is further configured to compare the estimated soot load to a predetermined soot load threshold.

18. The exhaust filtration system of claim 17, wherein the controller is further configured to run an exhaust filter regeneration process when the estimated soot load is higher than the predetermined soot load threshold.

19. The exhaust filtration system of claim 17, wherein the predetermined soot load threshold is at least 4.5 g/L.

20. The exhaust filtration system of claim 17, wherein the predetermined soot load threshold is in a range of 4.5-6 g/L.

21. The exhaust filtration system of claim 11, wherein, in the step of periodically determining the flow rate by the controller, the flow rate is updated at a rate of at least 5 Hz.

22. The exhaust filtration system of claim 11, wherein the first and second pressure sensors are calibrated for use in measuring a first range of pressures, and the third and fourth pressure sensors are calibrated for use in measuring a second range of pressures, wherein at least a portion of the second range of pressures is greater than at least a portion of the first range of pressures.

23. The exhaust filtration system of claim 11, wherein the first and second pressure sensors are rated for use in measuring a first range of pressures, and the third and fourth pressure sensors are rated for use in measuring a second range of pressures, wherein at least a portion of the second range of pressures is greater than at least a portion of the first range of pressures.

\* \* \* \* \*